US012755465B2

(12) United States Patent
Menon et al.

(10) Patent No.: US 12,755,465 B2
(45) Date of Patent: Oct. 6, 2026

(54) AUTOREGRESSIVE CONTENT RENDERING FOR TEMPORALLY COHERENT VIDEO GENERATION

(71) Applicant: SAMSUNG ELECTRONICS CO., LTD., Gyeonggi-Do (KR)

(72) Inventors: Varun Menon, Mountain View, CA (US); Siddarth Ravichandran, Santa Clara, CA (US); Ankur Gupta, San Jose, CA (US); Hyun Jae Kang, Mountain View, CA (US); Sajid Sadi, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 289 days.

(21) Appl. No.: 18/428,487

(22) Filed: Jan. 31, 2024

(65) Prior Publication Data

US 2024/0354996 A1 Oct. 24, 2024

Related U.S. Application Data

(60) Provisional application No. 63/461,186, filed on Apr. 21, 2023.

(51) Int. Cl.
*G06T 13/00* (2011.01)
*G06V 10/764* (2022.01)

(52) U.S. Cl.
CPC ............ *G06T 13/00* (2013.01); *G06V 10/764* (2022.01)

(58) Field of Classification Search
None
See application file for complete search history.

(56) References Cited

U.S. PATENT DOCUMENTS 8,224,652 B2 * 7/2012 Wang ...................... G10L 13/00 704/260
11,158,102 B2 10/2021 Liu et al.
(Continued)

FOREIGN PATENT DOCUMENTS

CN 111461959 A 7/2020
CN 113554737 A 10/2021
(Continued)

OTHER PUBLICATIONS

Paier, W., Hilsmann, A., & Eisert, P. (2021). Example-based facial animation of virtual reality avatars using auto-regressive neural networks. IEEE Computer Graphics and Applications, 41(4), 52-63. (Year: 2021).*
(Continued)

*Primary Examiner* — Ian L Lemieux
(74) *Attorney, Agent, or Firm* — Kevin T. Cuenot

(57) ABSTRACT

Autoregressive content rendering for temporally coherent video generation includes generating, by an autoencoder, a plurality of predicted images. The plurality of predicted images is fed back to the autoencoder network. The plurality of predicted images may be encoded by the autoencoder network to generate a plurality of encoded predicted images. The autoencoder network encodes a plurality of keypoint images to generate a plurality of encoded keypoint images. One or more predicted images of the plurality of predicted images are generated by the autoencoder network by decoding a selected encoded keypoint image of the plurality of encoded keypoint images with an encoded predicted image of the plurality of encoded predicted images of a prior iteration of the autoencoder network.

20 Claims, 12 Drawing Sheets

(56) References Cited

U.S. PATENT DOCUMENTS

| | | | | |
|---|---|---|---|---|
| 11,417,041 | B2 * | 8/2022 | Li | G06T 13/40 |
| 12,354,202 | B1 * | 7/2025 | Gupta | G10L 21/0272 |
| 2003/0206717 | A1 | 11/2003 | Yogeshwar et al. | |
| 2016/0180195 | A1 | 6/2016 | Martinson et al. | |
| 2020/0234690 | A1 * | 7/2020 | Savchenkov | G06V 40/171 |
| 2021/0327404 | A1 | 10/2021 | Savchenkov et al. | |
| 2022/0036617 | A1 * | 2/2022 | Biswas | G06N 3/088 |
| 2022/0067519 | A1 * | 3/2022 | Mishra | G06N 3/0455 |
| 2022/0198280 | A1 | 6/2022 | Yoon et al. | |
| 2023/0042654 | A1 | 2/2023 | Zhang | |
| 2024/0144568 | A1 * | 5/2024 | Gururani | G06N 3/045 |

FOREIGN PATENT DOCUMENTS

| | | | |
|---|---|---|---|
| CN | 113609255 | A | 11/2021 |
| EP | 3110153 | A1 | 12/2016 |

OTHER PUBLICATIONS

Du, C., Chen, Q., He, T., Tan, X., Chen, X., Yu, K., ... & Bian, J. (Oct. 2023). Dae-talker: High fidelity speech-driven talking face generation with diffusion autoencoder. In Proceedings of the 31st ACM International Conference on Multimedia (pp. 4281-4289). (Year: 2023).*

Stypułkowski, M., Vougioukas, K., He, S., Zięba, M., Petridis, S., & Pantic, M. (2023). Diffused Heads: Diffusion Models Beat GANs on Talking-Face Generation. arXiv preprint arXiv:2301.03396. (Year: 2023).*

Vougioukas, K., Petridis, S., & Pantic, M. (2020). Realistic Speech-Driven Facial Animation with GANs. International Journal of Computer Vision, 128, 1398-1413. (Year: 2020).*

Jinbo Xing, Menghan Xia, Yuechen Zhang, Xiaodong Cun, Jue Wang, Tien-Tsin Wong (v1 Jan v2 Apr. 3, 2023). CodeTalker: Speech-Driven 3D Facial Animation with Discrete Motion Prior. arXiv preprint arXiv:2301.02379 (Year: 2023).*

Song, L., Liu, B., Yin, G., Dong, X., Zhang, Y., & Bai, J. X. (Oct. 2021). Tacr-net: editing on deep video and voice portraits. In Proceedings of the 29th ACM International Conference on Multimedia (pp. 478-486). (Year: 2021).*

Wang, T. C., Mallya, A., & Liu, M. Y. (2021). One-shot free-view neural talking-head synthesis for video conferencing. In Proceedings of the IEEE/CVF conference on computer vision and pattern recognition (pp. 10039-10049). (Year: 2021).*

Zakharov, E., Shysheya, A., Burkov, E., & Lempitsky, V. (2019). Few-shot adversarial learning of realistic neural talking head models. In Proceedings of the IEEE/CVF international conference on computer vision (pp. 9459-9468). (Year: 2019).*

Manocha, P., & Guha, P. (2020). Facial Keypoint Sequence Generation from Audio. arXiv preprint arXiv:2011.01114. (Year: 2020).*

WIPO Int'l. Appln., No. PCTKR2024002523, International Search Report, 3 Pg.

WIPO Int'l. Appln., No. PCTKR2024002523, Written Opinion, 4 Pg.

Prajwal, Kr et al., "A lip sync expert is all you need for speech to lip generation in the wild," In Proceedings of the 28th ACM International Conference on Multimedia, Oct. 12, 2020, pp. 484-492.

Ravichandran, S. et al., "Synthesizing Photorealistic Virtual Humans Through Cross-modal Disentanglement," arXiv preprint, arXiv No. 2209.01320v2 [cs.CV], Mar. 2, 20234, 12 pg.

"Best AI Video Generator in 2024—Synthesia," [online] Synthesia Limited @ 2024 [retrieved Jan. 25, 2024], retrieved from the Internet: <https://www.synthesia.io/>, 9 pg.

* cited by examiner

AUTOREGRESSIVE CONTENT RENDERING FOR TEMPORALLY COHERENT VIDEO GENERATION

CROSS-REFERENCE TO RELATED APPLICATIONS

This application claims the benefit of U.S. Application No. 63/461,186 filed on Apr. 21, 2023, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to content rendering systems and, more particularly, to autoregressive content rendering systems for temporally coherent video generation.

BACKGROUND

The use of life-like avatars referred to as digital humans or virtual humans is becoming increasingly popular. Digital humans may be used in a variety of different contexts including, but not limited to, the metaverse, gaming, and as part of any of a variety of virtual experiences in which human beings increasingly wish to take part. Advances in computer technology and neural networks have enabled the rapid virtualization of many different "real world" activities. Still, the creation of digital humans has been, and remains, a complex task that requires cooperative operation of one or more neural networks and deep learning technologies. The digital human must be capable of interacting with a human being, e.g., by engaging in interactive dialog, in a believable manner. This entails overcoming challenges relating to the generation of a highly detailed visual rendering of the digital human, the generation of believable and natural animations synchronized with audio, and doing so such that interactions are perceived by human beings to occur in real-time operation and/or without undue delay.

An important aspect of creating digital humans is temporal coherence. From one frame to another, the video of the digital human should be free of visual artifacts such as jitter and glitches. Existing technologies used to generate digital humans rely on features that are common among different human models. For practical reasons, these features often include eye, mouth, nose, and jaw locations of the human model as specified by keypoints and/or contours provided to the generative systems as inputs. This type of input tends to be sparse and noisy and does not provide a generative system with the guidance necessary to generate temporally coherent video. The insufficiency often manifests in the generated video as jittery and/or glitchy motion of those features that are not common across different human models. Examples of uncommon features include, but are not limited to, hair, clothing, and/or other features that are not adequately represented by keypoints and/or contours.

In a multi-modal setting where the generative system uses keypoints, contours, and audio data as input, the audio features, like the keypoints and contours, include some noise. This noise manifests in the resulting video as jittery and/or glitchy movement of the mouth and/or lip region of the digital human.

Temporally accurate video is an important aspect of generating video of digital humans. As the resolution of the resulting video may be large enough that the video may be displayed on larger screens, temporal accuracy becomes an even larger concern. On larger screens, any unwanted artifacts in the generated video, e.g., jittery and/or glitchy motion, become more obvious. These artifacts only serve to deter human beings from engaging with digital humans.

SUMMARY

In one or more embodiments, a method includes generating, by an autoencoder network, a plurality of predicted images. The method includes feeding the plurality of predicted images back to the autoencoder network. The method includes encoding the plurality of predicted images to generate a plurality of encoded predicted images. The method includes encoding a plurality of keypoint images to generate a plurality of encoded keypoint images. One or more predicted images of the plurality of predicted images are generated by decoding a selected encoded keypoint image of the plurality of encoded keypoint images with an encoded predicted image of the plurality of encoded predicted images of a prior iteration of the autoencoder network.

In one or more embodiments, an autoencoder network includes a first encoder configured to encode a plurality of predicted images to generate a plurality of encoded predicted images. The autoencoder network includes a second encoder configured to encode a plurality of keypoint images to generate a plurality of encoded keypoint images. The autoencoder network includes a decoder configured to generate the plurality of predicted images by iteratively decoding a selected encoded keypoint image of the plurality of encoded keypoint images with an encoded predicted image of the plurality of encoded predicted images of a prior iteration of the autoencoder network.

In one or more embodiments a system, apparatus, and/or device includes a processor configured to execute the various operations described within this disclosure.

In one or more embodiments, a computer program product includes a computer readable storage medium having program instructions stored thereon. The program instructions are executable by a processor to perform the various operations described within this disclosure.

This Summary section is provided merely to introduce certain concepts and not to identify any key or essential features of the claimed subject matter. Many other features and embodiments of the disclosed technology will be apparent from the accompanying drawings and from the following detailed description.

BRIEF DESCRIPTION OF THE DRAWINGS

The accompanying drawings show one or more embodiments; however, the accompanying drawings should not be taken to limit the disclosed technology to only the embodiments shown. Various aspects and advantages will become apparent upon review of the following detailed description and upon reference to the drawings.

DETAILED DESCRIPTION

Figure 1:
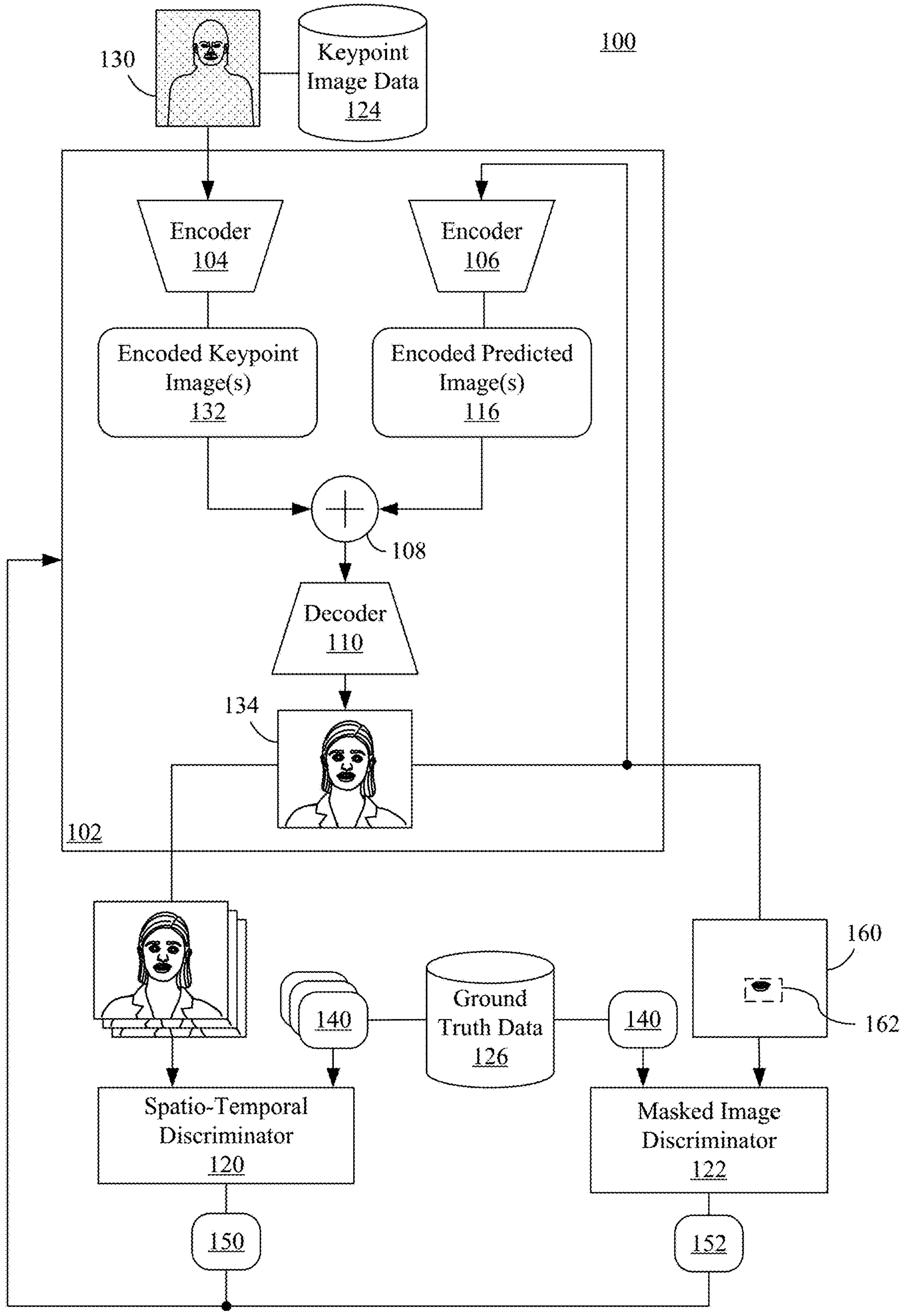
FIG. 1 illustrates an executable framework configured to train an autoencoder network according to one or more embodiments of the disclosed technology.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to content rendering systems and, more particularly, to autoregressive content rendering systems for temporally coherent video generation. Synthetic media generation is becoming increasingly popular for a variety of reasons. These reasons include, but are not limited to, the use of virtual humans in the metaverse becoming increasingly important and gaining more attention from users, the increasing adoption by users of virtual experiences from remote settings, advances in hardware, and recent advances in technology such as deep neural networks that facilitate rapid generation of such media (e.g., content).

The inventive arrangements described herein provide a solution to the technological problem where generative systems generate temporally inconsistent video. For purposes of illustration, consider a generative neural network that is tasked with generating a high-resolution image. The high-resolution image may be 768×768 pixels. The generative neural network is trained to produce the image frames one-by-one, e.g., frame-by-frame. In doing so, the video composed of these individual image frames may not be temporally coherent. The sparsity and noise in the input features provided to the generative neural network from which an image frame is generated is one cause of the lack of temporal coherence.

As an illustrative example, given a keypoint image that specifies input features such as the position of eyes, nose, and mouth as well as an outline (e.g., contour) for the digital human to be generated, the generative neural network generates an output image, referred to as a "predicted image." The keypoint image, which is considered a sparse input, provides some degree of controllability over the predicted image. The lack of information for particular regions makes consecutively generated image frames temporally incoherent in these regions. The keypoint image, for example, may provide no information as to clothing details such as edges of a shirt or the position of buttons. When the generated images are viewed in time as a video sequence, features of the digital human corresponding to these particular regions such as the edge of the shirt and/or a button jitter throughout the video as the keypoint images from which the individual generated images of the video were generated included no positional guidance on such features.

In one or more embodiments, a digital human is a computer-generated entity that is rendered visually with a human-like appearance. The digital human may be an avatar. In some embodiments, a digital human is a photorealistic avatar. In some embodiments, a digital human is a digital rendering of a hominid, a humanoid, a human, or other human-like character. A digital human may be an artificial human. A digital human can include elements of artificial intelligence (AI) for interpreting user input and responding to the input in a contextually appropriate manner. The digital human can interact with a user using verbal and/or non-verbal cues. Implementing natural language processing (NLP), a chatbot, and/or other software, the digital human can be configured to provide human-like interactions with a human being and/or perform activities such as scheduling, initiating, terminating, and/or monitoring of the operations of various systems and devices.

Methods, systems, and computer program products are provided that are capable of generating content that is temporally coherent. More particularly, the embodiments described within this disclosure are capable of generating video content that is temporally coherent. Video content generated in accordance with the inventive arrangements may be of low resolution or high resolution. In general, high-resolution video may be video in which the individual images (e.g., frames) have resolutions higher than 256×256 pixels. An example of high-resolution video is video formed of images of 768×768 pixels. Temporal coherence for video means that objects and/or visual features displayed in the video appear to move smoothly and/or remain still from one sequential image of the video to another without unwanted artifacts. Examples of unwanted artifacts include, but are not limited to, jitter and glitches.

In some aspects, an autoencoder network generates a plurality of predicted images. The plurality of predicted images is fed back to the autoencoder network. The plurality of predicted images may be encoded by the autoencoder network to generate a plurality of encoded predicted images. The autoencoder network encodes a plurality of keypoint images to generate a plurality of encoded keypoint images. One or more predicted images of the plurality of predicted images are generated by the autoencoder network by decoding a selected encoded keypoint image of the plurality of encoded keypoint images with an encoded predicted image of the plurality of encoded predicted images of a prior iteration of the autoencoder network.

A technical effect of the embodiments described herein is that the sparsity and noise in the input features, e.g., the keypoint images, is addressed by using a feedback mechanism that takes the predicted images as generated and output and feeds such predicted images back to the autoencoder network as additional input(s). The predicted images may be red, green, blue (RGB) images. The RGB images provide additional information describing particular regions for which the keypoint images lack information. As an illustrative and nonlimiting example, the predicted images as fed back may specify information about clothing, hair, facial hair, and/or other visual features lacking in the keypoint images.

For example, at each iteration of the autoencoder system, the predicted image from the prior iteration may be fed back to the autoencoder as an additional input. The predicted image, e.g., an RGB image, is a feature dense input that provides more positional and texture guidance to the autoencoder network. This recursive feedback makes the autoencoder network an auto-regressive network.

In some aspects, the autoencoder network is trained by generating a classification result by classifying one or more of the plurality of predicted images and one or more of a plurality of ground truth images as generated (e.g., fake or synthetic) or as ground truth (e.g., real). The classification result may be fed back to the autoencoder network.

In some aspects, the classifying operates on two or more of the plurality of predicted images and two or more of the plurality of ground truth images. A technical effect of using two or more, e.g., a subset of images or more than one image, in generating the classification result is that the training process results in a smoothing effect on the resulting motion in the video generated by the autoencoder network.

In some aspects, the one or more of the plurality of ground truth images correspond to the one or more of the plurality of predicted images used for the classifying on a one-to-one basis.

In some aspects, the autoencoder network is trained by generating a further classification result by classifying a selected masked predicted image of the plurality of predicted images and a ground truth image as generated or ground truth. The further classification result may be fed back to the autoencoder network. A technical effect of using the masked predicted image is focusing the autoencoder network on the portion of the predicted image that is unmasked to obtain greater detail in that region. For example, the masked predicted image may have only a mouth region showing. In other examples, any region for which improved detail is desired in the predicted image may be left unmasked. Such other regions may include, regions showing facial hair, regions showing hair (e.g., a hairstyle or portion thereof), or a region of clothing.

In some aspects, additional data of a modality that differs from the plurality of keypoint images and the plurality of predicted images may be encoded to generate encoded additional data. The one or more predicted images of the plurality of predicted images are generated by decoding the encoded additional data with the selected encoded keypoint image of the plurality of encoded keypoint images and the encoded predicted image of the plurality of encoded predicted images of the prior iteration of the autoencoder network. A technical effect of using data of a different modality is that such additional data may provide greater information for particular regions where greater detail and/or realism in the resulting digital human presented in the video is desired.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an executable framework 100 configured to train an autoencoder network according to one or more embodiments of the disclosed technology. Framework 100 is executable by one or more interconnected data processing systems (e.g., computers). An example of a data processing system that is suitable for executing framework 100 is described in connection with FIG. 9.

In the example, framework 100 includes autoencoder network 102. Autoencoder network 102 includes one or more encoders depicted as encoder 104 and encoder 106, a concatenator 108, and a decoder 110. In the example of FIG. 1, encoder 106 may be configured as a first encoder configured to encode a plurality of predicted images to generate a plurality of encoded predicted images 116. Encoder 104 may be a second encoder configured to encode a plurality of keypoint images 130 to generate a plurality of encoded keypoint images 132. Decoder 110 may be configured to generate the plurality of predicted images 134 by iteratively decoding a selected encoded keypoint image of the plurality of encoded keypoint images 132 with an encoded predicted image of the plurality of encoded predicted images 116 of a prior iteration of autoencoder network 102.

Framework 100 also includes a plurality of discriminators. The discriminators are illustrated as spatio-temporal discriminator 120 and masked image discriminator 122. Spatio-temporal discriminator 120 and masked image discriminator 122 may be used in cooperation with autoencoder network 102 for purposes of training. Framework 100 also may include one or more data storage devices configured to store keypoint image data 124 and ground truth data 126.

Spatio-temporal discriminator 120 may be configured to generate a classification result 150 by classifying two or more predicted images of the plurality of predicted images 134 and two or more ground truth images of a plurality of ground truth images 140 as "generated" (e.g., synthesized or fake) or "ground truth" (e.g., real). Classification result 150 is fed back to autoencoder network 102. Masked image discriminator 122 is configured to generate a further classification result 152 by classifying a selected masked predicted image 160 of the plurality of predicted images 134 and a ground truth image 140 as "generated" or "ground truth." Classification result 152 is fed back to autoencoder network 102.

In the example of FIG. 1, autoencoder network 102 is implemented as an autoregressive network in that the predictions generated and output are fed back to autoencoder network 102 as input, e.g., as feedback. In one or more embodiments, autoencoder network 102 is implemented as an autoregressive, Variational Autoencoder (VAE). An autoencoder refers to an unsupervised artificial neural network that learns how to efficiently compress and encode data. The autoencoder learns how to reconstruct the data back from the reduced encoded representation to a representation that is as close to the original input as possible. A VAE is an autoencoder whose encodings distribution is regularized during the training in order to ensure that the latent space has properties sufficient to allow the generation of some portion of new data.

In operation, autoencoder network 102 may begin operation by obtaining a keypoint image 130-1 from keypoint image data 124. Keypoint image 130-1 is provided to encoder 104. Encoder 104 is configured to translate keypoint image 130-1 into a latent space representation referred to as an encoded keypoint image 132. In the first iteration of autoencoder network 102, there is no output available to feedback as input. That is, a predicted image has not yet been generated. Accordingly, in the first iteration of autoencoder network 102, no feedback is provided as none is available. In one aspect, a zero image may be provided as input to encoder 106 in lieu of a fed back predicted image 134. A "zero image" refers to an image with the mean value of its pixels set to zero. Concatenator 108 may pass encoded keypoint image 132-1, which may be encoded as a tensor data structure, on to decoder 110, which is trained to generate a predicted image 134-1. Predicted image 134-1 is an RGB image.

In a next iteration of autoencoder network 102, predicted image 134-1, as generated and/or output in the first iteration of autoencoder network 102, is fed back to autoencoder network 102 as feedback. More particularly, predicted image 134-1 is fed to encoder 106 while a next or second keypoint image 130-2 is provided to encoder 104. Encoder 106 is configured to translate predicted image(s) 134 into encoded predicted image(s) 116. Accordingly, encoder 104 translates the next or second keypoint image 130-2 into a further encoded keypoint image 132-2 while encoder 106 translates predicted image 134-1 from the prior iteration of autoencoder network 102 into encoded predicted image 116-1. Concatenator 108 concatenates the encoded keypoint image 132-2 with the encoded predicted image 116-1 as generated from the predicted image 134-1 from the prior iteration, e.g., in this example the first iteration, of autoencoder network 102 and provides the resulting data, e.g., a tensor data structure, to decoder 110. Decoder 110 is trained to generate another predicted image 134-2.

Training of autoencoder network 102 may be achieved using spatio-temporal discriminator 120. Training of autoencoder network 102 also may be achieved using masked image discriminator 122. The discriminators may be used individually or in combination. Referring to spatio-temporal discriminator 120, spatio-temporal discriminator 120 is configured to operate on a plurality of predicted images 134 at a time. For purposes of illustration, spatio-temporal discriminator 120 receives a subset of N predicted images 134. N predicted images 134 are accumulated and provided as a group (e.g., a subset) to spatio-temporal discriminator 120. Accordingly, spatio-temporal discriminator 120 may operate one time for every N predicted images 134 generated by autoencoder network 102. Spatio-temporal discriminator 120 also receives a plurality of ground truth images 140 from ground truth data 126. Each ground truth image is an RGB image, e.g., an image frame, that corresponds to the particular keypoint image 130 from which a particular predicted image 130 is generated. Thus, spatio-temporal discriminator 120 receives N different ground truth images 140. The subset of N predicted images 134 correspond to the N ground truth images 140 on a one-to-one basis. For example, if spatio-temporal discriminator 120 receives N different sequentially generated predicted images 134 (e.g., 134-1, 134-2, and 134-3), the subset of N ground truth images received by spatio-temporal discriminator 120 will be the ground truth images (e.g., actual or real images) 140-1, 140-2, and 140-3 from which keypoint images 130-1, 130-2, and 130-3 are generated. In this example, it is presumed that predicted image 134-1 is generated from keypoint image 130-1, that predicted image 134-2 is generated from keypoint image 130-2, and that predicted image 134-3 is generated from keypoint image 130-3.

In one or more embodiments, the combination of autoencoder network 102 and masked image discriminator 122 implements a Generative Adversarial Network (GAN). In general, a GAN includes two neural networks referred to as a generator and a discriminator. The generator, which in this example is autoencoder network 102, and the discriminator, e.g., spatio-temporal discriminator 120, are engaged in a zero-sum game with one another. Given a training set, a GAN is capable of learning to generate new data with the same statistics as the training set. As an illustrative example, a GAN that is trained on an image or image library is capable of generating different images that appear authentic to a human observer. In a GAN, the generator generates images. The discriminator determines a measure of realism of the images generated by the generator. As both neural networks may be dynamically updated during operation (e.g., continually trained during operation), the GAN is capable of learning in an unsupervised manner where the generator seeks to generate images with increasing measures of realism as determined by the discriminator.

In the example of FIG. 1, for training purposes, spatio-temporal discriminator 120 attempts to determine which received images are generated (e.g., fake or synthesized) and which are real (e.g., ground truth). In the example, spatio-temporal discriminator 120 operates, as one iteration of spatio-temporal discriminator 120, on the N predicted images 134 and the corresponding N ground truth images 140. In an example implementation N may be set equal to 3. In other implementations, N may be set equal to values greater or lower than 3. Spatio-temporal discriminator 120 is configured to perform classification on the N predicted images 134 and the corresponding N ground truth images 140 to generate classification result 150. Classification result 150 may specify one or more probabilities that each received image (each of the N predicted images 134 and each of the received ground truth images 140) is considered generated or ground truth.

Classification result 150 is provided to autoencoder network 102. For example, spatio-temporal discriminator 120 is capable of providing a signal to autoencoder network 102, e.g., via backpropagation, so that autoencoder 102 may update one or more weights therein.

Referring to masked image discriminator 122, masked image discriminator 122 is configured to operate on a masked version of a single predicted image 134 and a single ground truth image 140 at a time. Like operation of spatio-temporal discriminator 120, the masked version of the predicted image 134 and the ground truth image 140 operated on by masked image discriminator 122 correspond to one another on a one-to-one basis. For example, if masked image discriminator 122 receives a masked version of predicted image 134-1, the ground truth image received by masked image discriminator 122 will be the ground truth image (e.g., actual or real image) 140-1 from which the keypoint image 130-1 is generated. In this example, it is presumed that predicted image 134-1 is generated from keypoint image 130-1.

In the example, a masked predicted image 160 is illustrated. Masked predicted image 160 is a masked version of predicted image 134-1 in which all regions other than one selected region, i.e., region 162, are masked. In one or more embodiments, masking refers to removing details, features, and/or portions of an image for the region that is to be masked. The region that is not masked in this example is the mouth region. Thus, all other portions that are masked may be effectively removed or zeroed from the image. The exposed or unmasked mouth region 162 illustrates details that may include, but are not limited to, mouth position, lips, tongue, and/or teeth. In other examples, any region for which improved detail is desired in the predicted image may be left unmasked. Such other regions may include, regions showing facial hair, regions showing hair (e.g., a hairstyle or portion thereof), or a region of clothing.

In one or more embodiments, the combination of autoencoder network 102 and masked image discriminator 122 implements another GAN where autoencoder network 102 is the generator and masked image discriminator 122 is the discriminator. In the example of FIG. 1, for training purposes, masked image discriminator 122 attempts to determine which received images are generated (e.g., fake or synthesized) and which are real (e.g., ground truth).

In one or more embodiments, spatio-temporal discriminator 120 operates on subsets of N images every and, as such, operates every Nth iteration of autoencoder network 102. Such is the case as a smoothing effect is desired from operation of spatio-temporal discriminator 120 with respect to temporal coherence. The classification results 150 from spatio-temporal discriminator 120 help autoencoder network 102 learn to spatio-temporal relations to help alleviate jitter. This serves to smooth motion and help generate temporally coherent videos. Providing classification result 150 from spatio-temporal discriminator 120 every N iterations allows the feedback (e.g., the prior predicted image 134) to continue to provide spatial coherence for the next predicted image owing to the increase in feature density and reduction in noise.

In one or more embodiments, masked image discriminator 122 operates on every iteration of autoencoder network 102. In some embodiments, spatio-temporal discriminator 120 may smooth certain regions of the image, e.g., the mouth region and motion thereof, too much which reduces expressiveness of the digital human. Masked image discriminator 122 accommodates for this effect by increasing expressiveness of the desired region (e.g., the unmasked region). Operation of masked image discriminator 122 each iteration serves to provide a larger amount of guidance during training with respect to regions that require increased detail for realism. In this example, the region requiring increased realism is the unmasked region.

Accordingly, masked image discriminator 122 is configured to perform classification on each iteration of autoencoder network 102 that a masked predicted image 160 and corresponding ground truth image 140 are available to generate classification result 152. Classification result 152 may specify one or more probabilities that each received image (each of the masked predicted image 160 and the ground truth image 140) is considered generated or ground truth.

Classification result 152 is provided to autoencoder network 102. For example, masked image discriminator 122 is capable of providing a signal to autoencoder network 102, e.g., via backpropagation, so that autoencoder 102 may update one or more weights therein.

Figure 2:
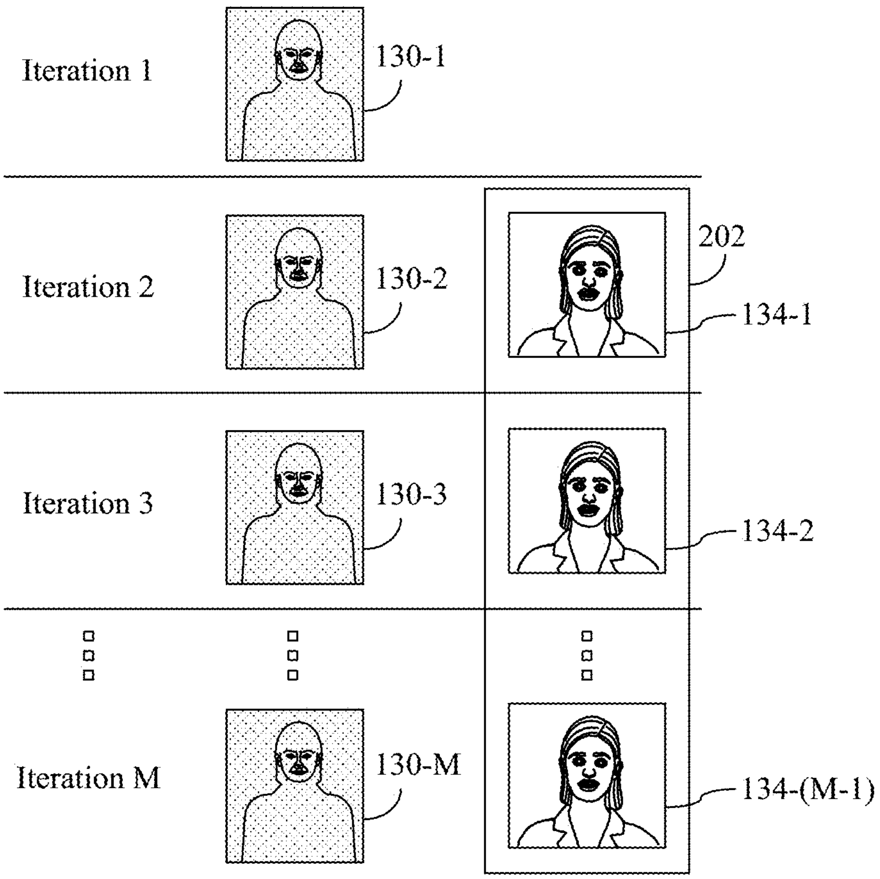
FIG. 2 illustrates certain operative features of the autoencoder network of FIG. 1 in accordance with one or more embodiments of the disclosed technology.

FIG. 2 illustrates certain operative features of autoencoder network 102 of FIG. 1 in accordance with one or more embodiments of the disclosed technology. In the example, a feedback path 202 of autoencoder network 102 is illustrated along with the contents of that feedback path over multiple iterations of autoencoder network 102.

In the example of FIG. 2, in iteration 1 of autoencoder network 102, keypoint image 130-1 is processed. As no output has been generated by autoencoder network 102, there is no corresponding predicted image to be fed back and processed as of yet. In one or more embodiments, a zero image may be provided to encoder 106 in the first iteration of autoencoder network 102.

In iteration 2 of autoencoder network 102, a next keypoint image 130-2 is processed concurrently with predicted image 134-1. Predicted image 134-1 is the predicted image that was generated as output during iteration 1.

In iteration 3 of autoencoder network 102, a next keypoint image 130-3 is processed concurrently with predicted image 134-2. Predicted image 134-2 is the predicted image that was generated as output during iteration 2.

The process continues until iteration M (e.g., where N and M within this disclosure are integer values). In iteration M of autoencoder network 102, next keypoint image 130-M is processed concurrently with predicted image 134-(M−1). Predicted image 134-(M−1) is the predicted image that is generated as output during iteration (M−1) or the next to last iteration of autoencoder network 102.

In the example of FIG. 2, in cases where additional data of one or more other modalities are provided to and/or used by autoencoder network 102 such additional data, as encoded, is provided for each iteration in the same or similar manner as the encoded keypoint images. Further discussion of the use of additional data of different modalities is described hereinbelow in greater detail.

Figure 3:
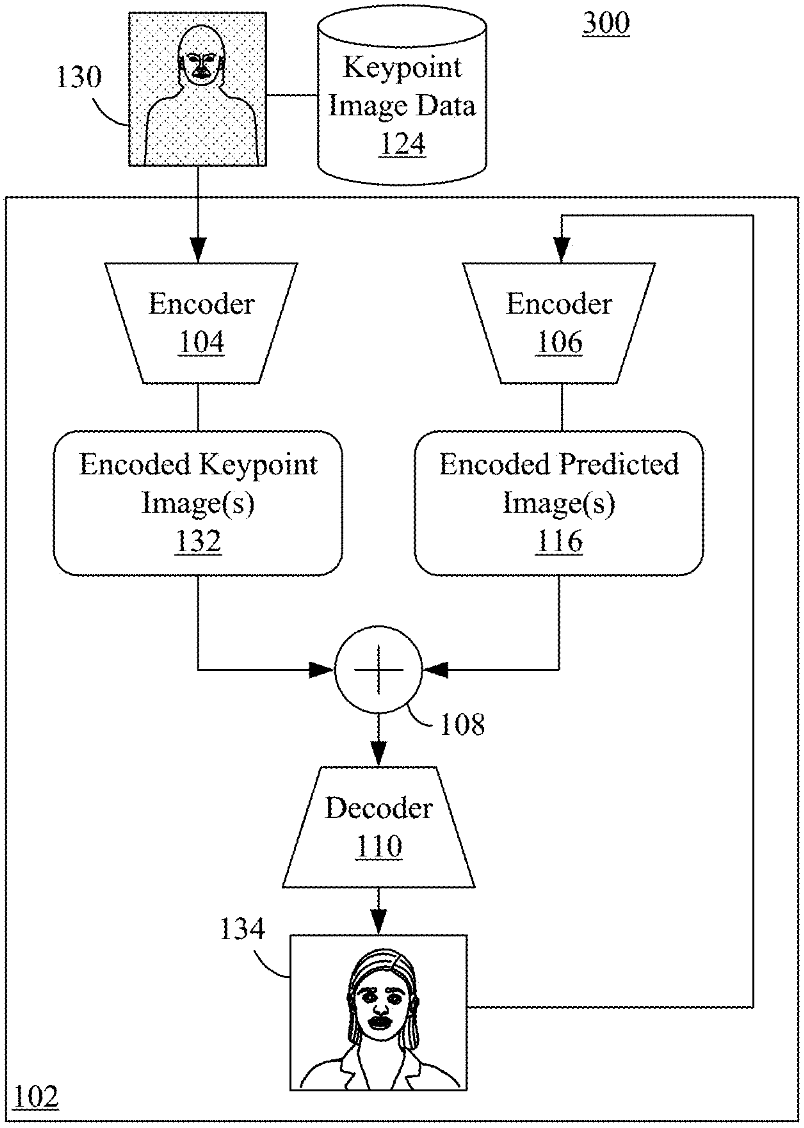
FIG. 3 illustrates an executable framework configured to perform inference in accordance with one or more embodiments of the disclosed technology.

FIG. 3 illustrates an executable framework 300 configured to perform inference in accordance with one or more embodiments of the disclosed technology. Framework 300 is executable by one or more interconnected data processing systems (e.g., computers). An example of a data processing system that is suitable for executing framework 300 is described in connection with FIG. 9. In the example, framework 300 includes autoencoder network 102. Keypoint image data 124 may also be included or coupled to autoencoder network 102.

In the example, spatio-temporal discriminator 120 and masked image discriminator 122 have been removed. Once autoencoder network 102 is trained, use of spatio-temporal discriminator 120 and masked image discriminator 122 is no longer needed. Similarly, the feedback of classification result 150 and classification result 152 is no longer needed. As illustrated, however, feedback of the predicted images 134 back to encoder 106 is preserved while performing inference. For example, feedback path 202 illustrated in FIG. 2 is maintained for purposes of performing inference (e.g., continued generation of predicted images 134).

Figure 4:
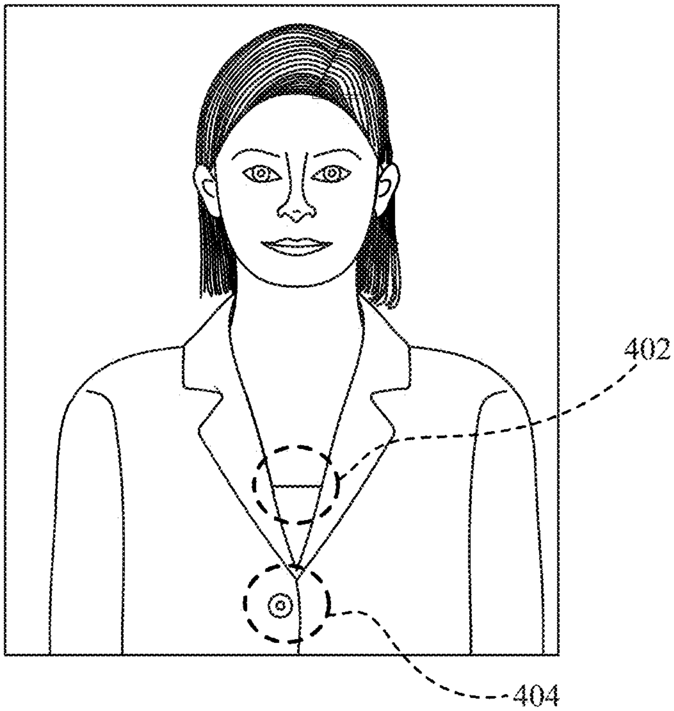
FIG. 4 illustrates certain operative features of an autoencoder network as trained in accordance with one or more embodiments of the disclosed technology.

FIG. 4 illustrates certain operative features of autoencoder network 102 as trained in accordance with one or more embodiments of the disclosed technology. In FIG. 4, an example of a predicted image 134 is illustrated. Though shown as a line drawing, predicted image 134 is an RGB image. Region 402 corresponds to a top edge of a clothing item which is a shirt in this example. Region 404 corresponds to a button of a clothing item of a jacket.

In using conventional generative neural networks, the placement or location of the top edge of the shirt in region 402 and the location and/or appearance of the button from region 404 would change from one predicted image to the next in a sequence of such predicted images. When the sequences of predicted images are played as a video, region 402 and 404 would appear to jitter as the top edge of the shirt and the button would appear to jump to varying locations from one predicted image to the next in the video sequence. Further, the appearance of the button may vary from one predicted image to the next in the video sequence. These types of artifacts significantly reduce the quality of the resulting video making the digital human appear glitchy and unreal.

In using the inventive arrangements described herein, the additional information provided to autoencoder network 102 allows autoencoder network 102 to render regions 402 and 404 with a greater degree or amount of spatial coherence. That is, the top edge of the shirt and the button will appear to be more stable from one predicted image to the next in the video sequence. The jitter and glitching are reduced if not eliminated. Further, the appearance of the button is consistent or more consistent from one predicted image to the next in the video sequence.

Figure 5:
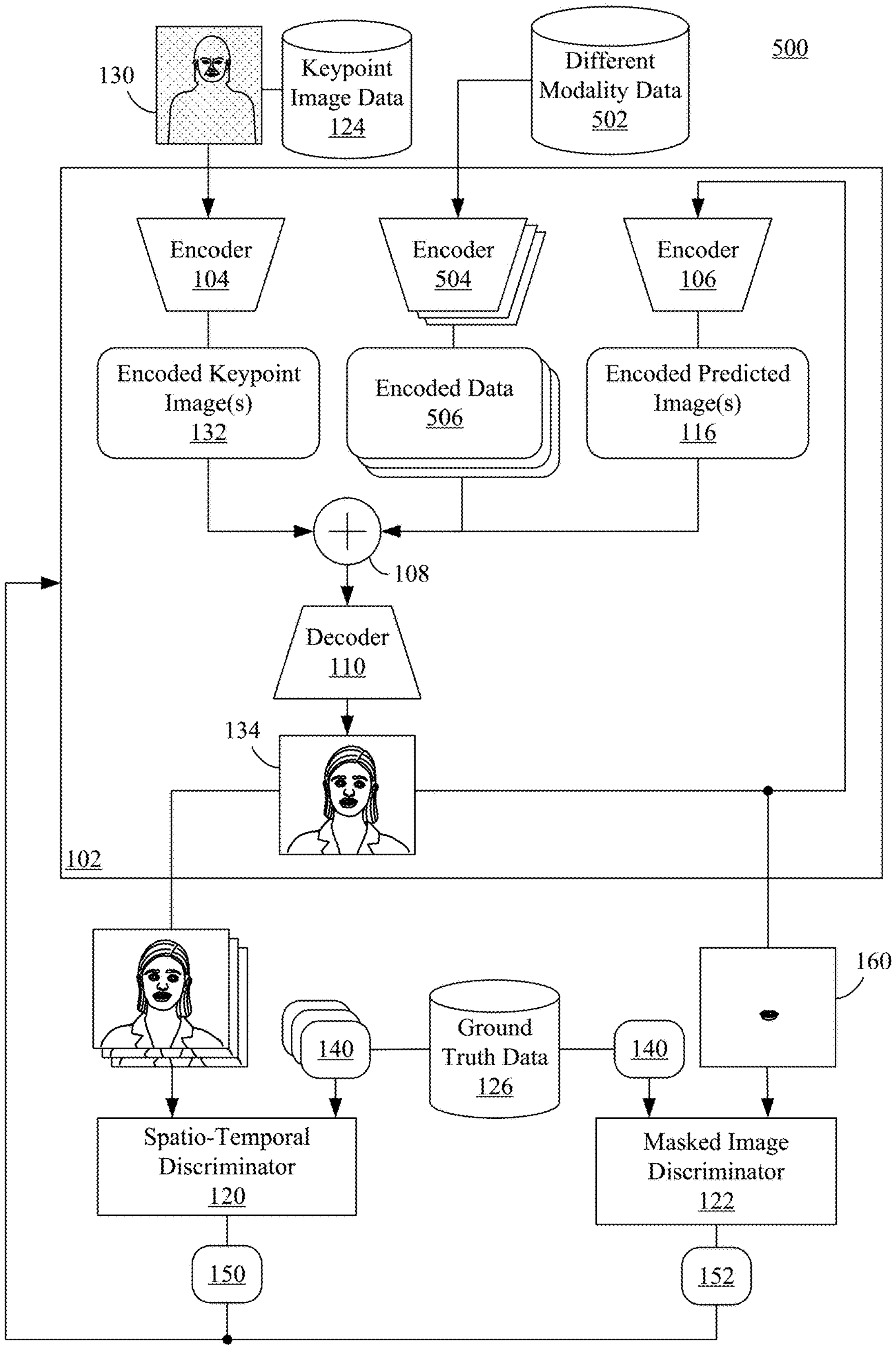
FIG. 5 illustrates another executable framework configured to train an autoencoder network according to one or more embodiments of the disclosed technology.

FIG. 5 illustrates another executable framework 500 configured to train an autoencoder network according to one or more embodiments of the disclosed technology. Framework 500 is executable by one or more interconnected data processing systems (e.g., computers). An example of a data processing system that is suitable for executing framework 500 is described in connection with FIG. 9.

In some aspects, autoencoder network 102 may include one or more additional encoders configured to encode additional data of a modality that differs from the plurality of keypoint images and the plurality of predicted images to generate encoded additional data. In that case, the decoder iteratively decodes the encoded additional data with the selected encoded keypoint image of the plurality of encoded keypoint images and the encoded predicted image of the plurality of encoded predicted images of the prior iteration of the autoencoder network. Examples of additional data and encoders that may be used include, but are not limited to, audio data (and an audio encoder), facial expression data (and a facial expression encoder), and text data (a text encoder).

In the example, framework 500 incorporates one or more different modalities of data that may be stored in a data storage device as different modality data 502. In addition, for each different modality of data that is included, a corresponding encoder 504 may be added that is configured to encode the received data of the selected modality type into encoded data 506. Encoded data 506 may be concatenated with the other data (e.g., encoded keypoint image 132 and encoded predicted image 116) into a tensor data structure that is provided to decoder 110.

For example, both keypoint image data 124 and the predicted images 134 may be considered images or visual data. In one or more embodiments, an additional modality that may be included is audio data. In such an example, different modality data 502 may include audio data such as the speech that the digital human being generated will be saying in the video sequence formed of the sequential predicted images 134. The audio data provides autoencoder network 102 with information that informs autoencoder network 102 how to better form the mouth, lips, and/or tongue region of the predicted images 134. In this example, encoder 504 may be an audio encoder and encoded data 506 may be encoded audio data. The encoded audio data may specify various features such as Mel Frequency Cepstral Coefficients (MFCCs), phoneme data, viseme data, other audio data, or any combination thereof.

In one or more embodiments, an additional modality that may be included is facial expression data. In such an example, different modality data 502 may include facial expression data that specifies desired attributes of the facial expression of the digital human to be generated. For example, the facial expression data may specify smile, frown, furrowed brow, smile with teeth, laugh, etc. The facial expression data provides autoencoder network 102 with information that informs autoencoder network 102 how to better form the facial expression of the digital human in the predicted images 134. In this example, encoder 504 may be a facial expression encoder and encoded data 506 may be encoded facial expression data.

The particular number of additional modalities of data and encoders included is not intended to be limited by the particular examples provided. It should be appreciated that in one or more embodiments, framework 500 may use keypoint image data 124, feedback of predicted images 134, and audio data. In one or more other embodiments, framework 500 may use keypoint image data 124, feedback of predicted images 134, and facial expression data. In one or more other embodiments, framework 500 may use keypoint image data 124, feedback of predicted images 134, facial expression data, and audio data.

The remaining portions of framework 500 such as spatio-temporal discriminator 120 and masked image discriminator 122 may operate as previously described. In one or more embodiments, classification result 150 and classification result 152 may be provided to each encoder included in autoencoder network 102. In one or more other embodiments, classification result 150 and classification result 152 may be provided to each encoder and to the decoder in autoencoder network 102.

Figure 6:
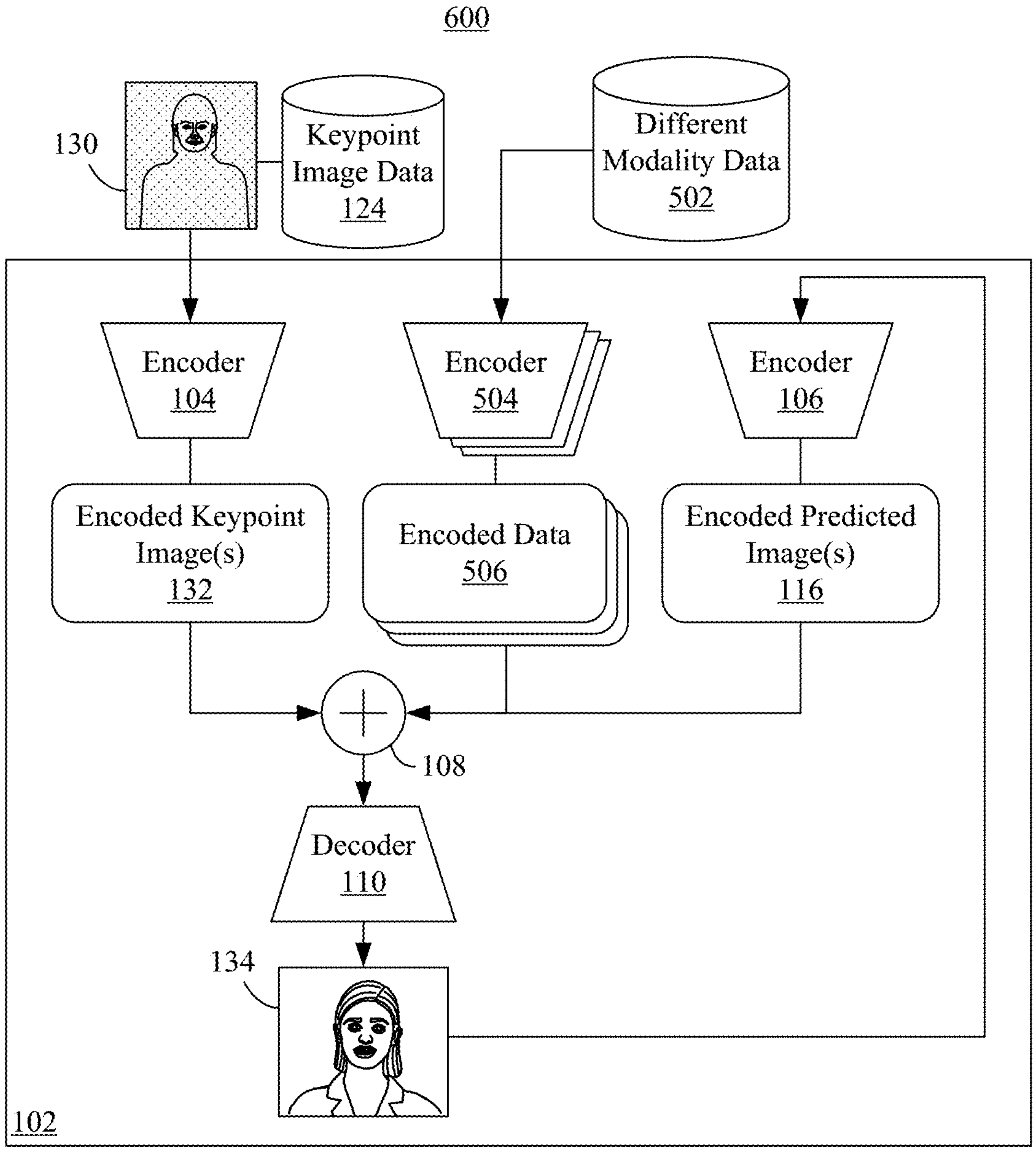
FIG. 6 illustrates another executable framework configured to perform inference in accordance with one or more embodiments of the disclosed technology.

FIG. 6 illustrates another executable framework 600 configured to perform inference in accordance with one or more embodiments of the disclosed technology. Framework 600 is executable by one or more interconnected data processing systems (e.g., computers). An example of a data processing system that is suitable for executing framework 600 is described in connection with FIG. 9. In the example, framework 600 includes autoencoder network 102 as described in connection with FIG. 5. As shown, the feedback path providing predicted images 134 to encoder 106 is preserved. Spatio-temporal discriminator 120 and masked image discriminator 122 have been removed as such components and the classifications generated by such components are not required once autoencoder network 102 has been trained.

Figure 7:
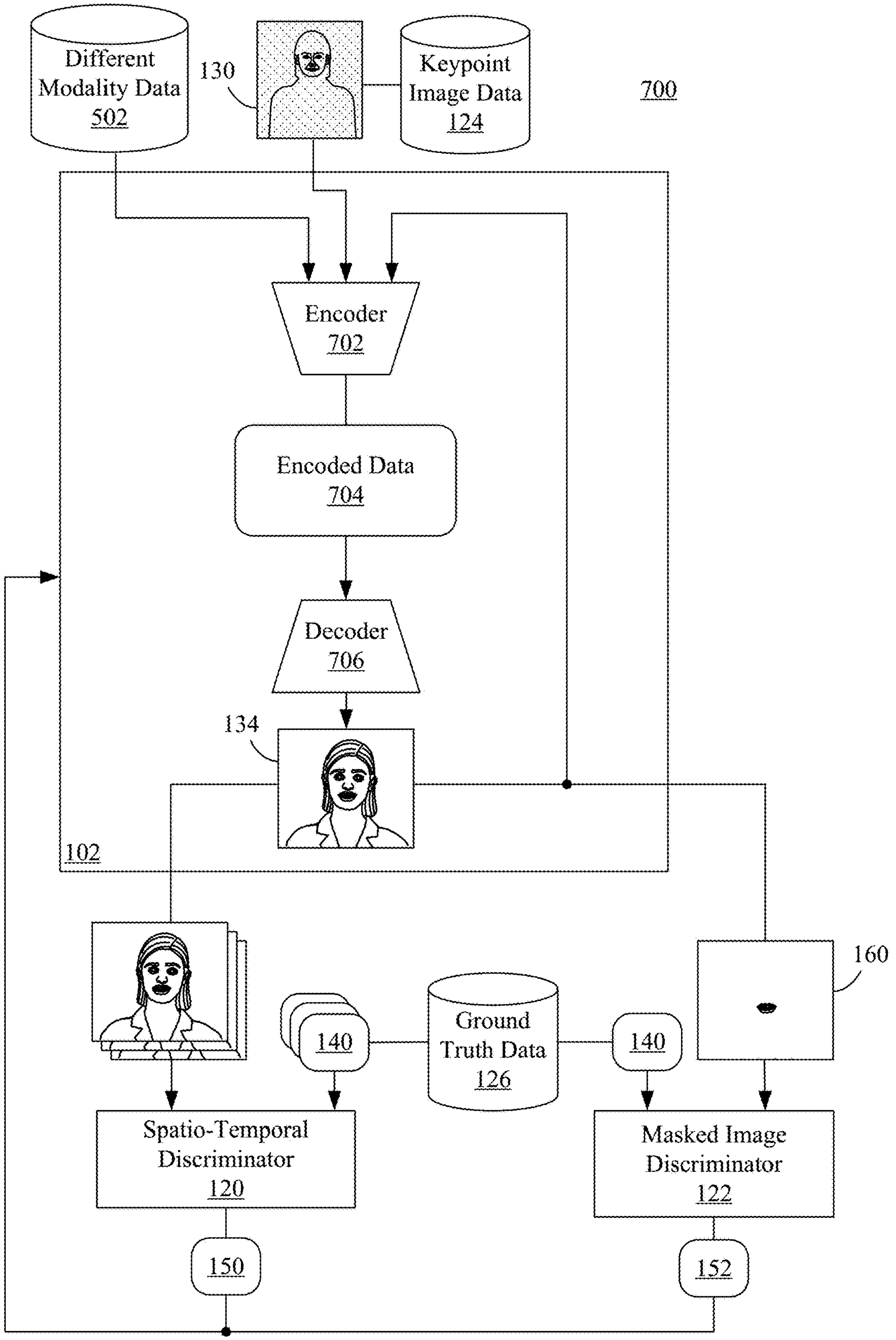
FIG. 7 illustrates another executable framework configured to train an autoencoder network according to one or more embodiments of the disclosed technology.

FIG. 7 illustrates another executable framework 700 configured to train an autoencoder network according to one or more embodiments of the disclosed technology. Framework 700 is executable by one or more interconnected data processing systems (e.g., computers). An example of a data processing system that is suitable for executing framework 700 is described in connection with FIG. 9.

In the example of FIG. 7, the different types of data are provided to a single encoder 702 that generates encoded data 704 (e.g., a tensor data structure). Encoded data 704 is provided to decoder 706. Decoder 706 is configured to generate predicted image(s) 134 (e.g., RGB images).

In one or more embodiments, optionally data of one or more additional modalities as described in connection with FIG. 5 may be used in the example of FIG. 7. In that case, such different modality data 502 may be provided to encoder 702 and included in encoded data 704 that is provided to decoder 706 for decoding.

The remaining portions of framework 500 such as spatio-temporal discriminator 120 and masked image discriminator 122 may operate as previously described. In one or more embodiments, classification result 150 and classification result 152 may be provided to encoder 702 included in autoencoder network 102. In one or more other embodiments, classification result 150 and classification result 152 may be provided to encoder 702 and to decoder 706 in autoencoder network 102.

Figure 8:
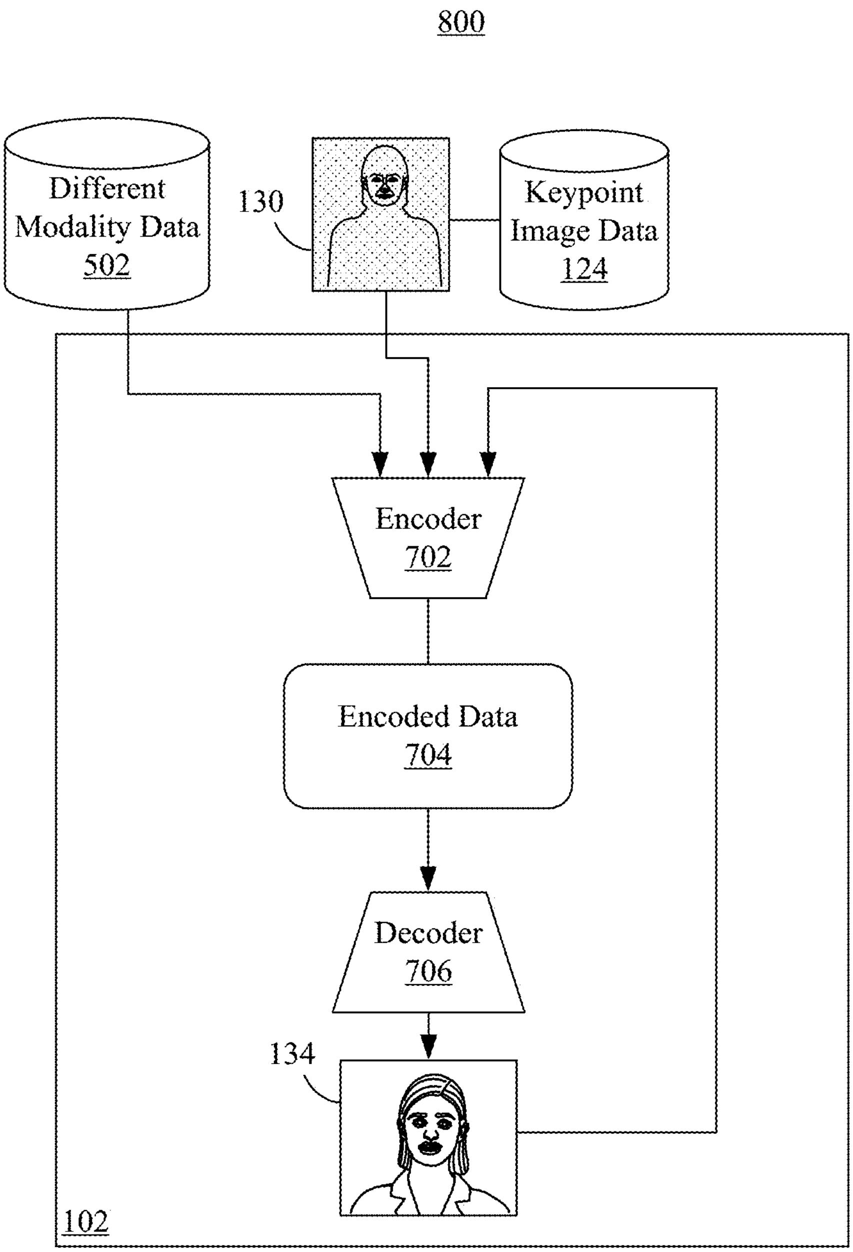
FIG. 8 illustrates another executable framework configured to perform inference in accordance with one or more embodiments of the disclosed technology.

FIG. 8 illustrates another executable framework 800 configured to perform inference in accordance with one or more embodiments of the disclosed technology. Framework 800 is executable by one or more interconnected data processing systems (e.g., computers). An example of a data processing system that is suitable for executing framework 800 is described in connection with FIG. 9. In the example, framework 800 includes autoencoder network 102 as described in connection with FIG. 7. As shown, the feedback path providing predicted images 134 to encoder 106 is preserved. Spatio-temporal discriminator 120 and masked image discriminator 122 have been removed as such components and the classifications generated by such components are not required once autoencoder network 102 has been trained. As noted, one or more different modalities of data 502 optionally may be used and provided to encoder 702.

Figure 9:
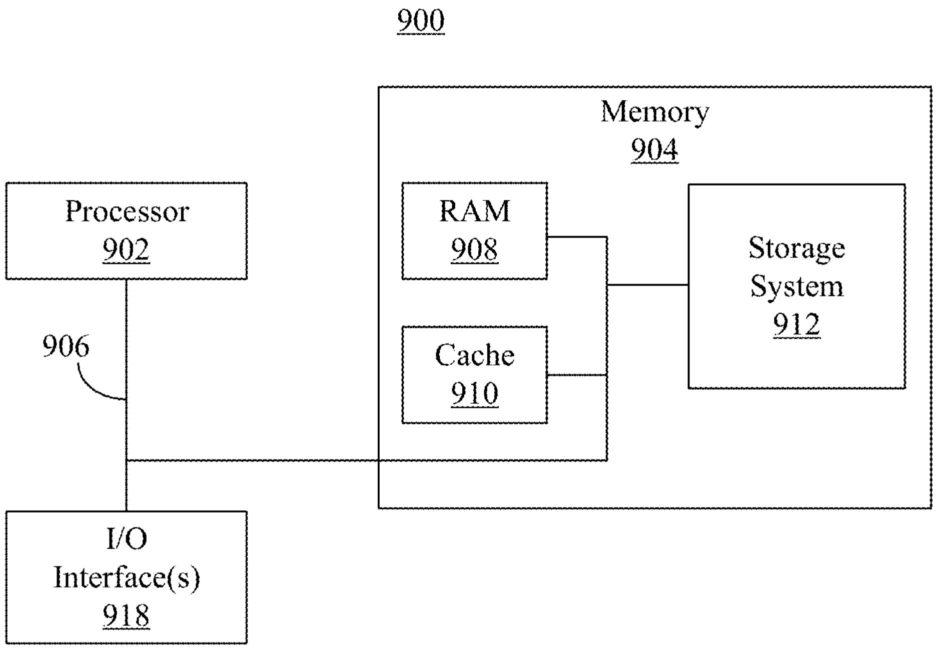
FIG. 9 illustrates an example implementation of a data processing system for use with the inventive arrangements described herein.

FIG. 9 illustrates an example implementation of a data processing system 900. As defined herein, the term "data processing system" means one or more hardware systems configured to process data, each hardware system including at least one processor and memory, wherein the processor is programmed with computer-readable instructions that, upon execution, initiate operations. Data processing system 900 can include a processor 902, a memory 904, and a bus 906 that couples various system components including memory 904 to processor 902.

Processor 902 may be implemented as one or more processors. In an example, processor 902 is implemented as a central processing unit (CPU). Processor 902 may be implemented as one or more circuits, e.g., hardware, capable of carrying out instructions contained in program code. The circuit may be an integrated circuit or embedded in an integrated circuit. Processor 902 may be implemented using a complex instruction set computer architecture (CISC), a reduced instruction set computer architecture (RISC), a vector processing architecture, or other known architecture. Example processors include, but are not limited to, processors having an x86 type of architecture (IA-32, IA-64, etc.), Power Architecture, ARM processors, Digital Signal Processors (DSPs), Graphics Processing Units (GPUs), and the like.

Bus 906 represents one or more of any of a variety of communication bus structures. By way of example, and not limitation, bus 906 may be implemented as a Peripheral Component Interconnect Express (PCIe) bus. Data processing system 900 typically includes a variety of computer system readable media. Such media may include computer-readable volatile and non-volatile media and computer-readable removable and non-removable media.

Memory 904 can include computer-readable media in the form of volatile memory, such as random-access memory (RAM) 908 and/or cache memory 910. Data processing system 900 also can include other removable/non-removable, volatile/non-volatile computer storage media. By way of example, storage system 912 can be provided for reading from and writing to a non-removable, non-volatile magnetic and/or solid-state media (not shown and typically called a "hard drive"), which may be included in storage system 912. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 906 by one or more data media interfaces. Memory 904 is an example of at least one computer program product.

Memory 904 is capable of storing computer-readable program instructions that are executable by processor 902. For example, the computer-readable program instructions can include an operating system, one or more application programs, other program code, and program data. In one or more embodiments, memory 904 may store the executable framework of FIGS. 1, 3, 5, 6, 7, and/or 8 as described herein such that processor 902 may execute such framework(s).

Processor 902, in executing the computer-readable program instructions, is capable of performing the various operations described herein that are attributable to a computer. It should be appreciated that data items used, generated, and/or operated upon by data processing system 900 are functional data structures that impart functionality when employed by data processing system 900. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 900 may include one or more Input/Output (I/O) interfaces 918 coupled to bus 906. I/O interface(s) 918 allow data processing system 900 to communicate with one or more external devices and/or communicate over one or more networks such as a local area network (LAN), a wide area network (WAN), wireless and/or wired networks, and/or a public network (e.g., the Internet). Examples of I/O interfaces 918 may include, but are not limited to, network cards, modems, network adapters, hardware controllers, etc. Examples of external devices also may include devices that allow a user to interact with data processing system 900 (e.g., a display, a keyboard, and/or a pointing device) and/or other devices. Data processing system 900 may include additional devices, e.g., a display, upon which images and/or video using such images generated as described herein may be displayed.

Data processing system 900 is only one example implementation. Data processing system 900 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 9 is not intended to suggest any limitation as to the scope of use or functionality of example implementations described herein. Data processing system 900 is an example of computer hardware that is capable of performing the various operations described within this disclosure. In this regard, data processing system 900 may include fewer components than shown or additional components not illustrated in FIG. 9 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

In one or more other embodiments, data processing system 900 or another one similar thereto may be used to implement a server or a client device. In this regard, data processing system 900 may include additional components, devices, peripherals, sensors, and/or systems such as one or more wireless radios and/or transceivers (not shown), an audio system including transducers such as a microphone and speaker, a camera, and/or other available peripheral devices.

Examples of various devices and/or systems that may be implemented using a hardware architecture as illustrated in FIG. 9 and execute the various executable frameworks described herein either individually or in combination with other devise can include one or more of a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, information appliance, IoT device, server, a virtual reality (VR) system, an augmented reality (AR) system, a mixed reality (MR) system, and extended reality (XR) system, a metaverse system, or the like. In another example, the hardware architecture of FIG. 9 may be used to implement a kiosk configured with a video display and/or audio capabilities, or other computing or information appliance that may be positioned so as to be accessible by a plurality of different users over time.

The inventive arrangements described herein may be used to generate digital humans within virtual computing environments, e.g., metaverse worlds. The digital humans may be generated in high resolution for use as avatars, for example. The high-quality and high resolution achieved is suitable for such environments where close-up interaction with the digital human is likely. Different example contexts and/or use cases in which autoencoder network 102 may be used, particularly in the case where digital humans are conveyed as the content are discussed below.

In one or more embodiments, autoencoder network 102 may be used to generate or provide a virtual assistant. The virtual assistant may be presented on a device within a business or other entity such as a restaurant. The device may present the virtual assistant embodied as a digital human driven by autoencoder network 102 in lieu of other conventional kiosks found in restaurants and, in particular, fast-food establishments. The device, driven by autoencoder network 102, may present a digital human configured to operate as a virtual assistant that is pre-programmed to help with food ordering. The virtual assistant can be configured to answer questions regarding, for example, ingredients, allergy concerns, or other concerns as to the menu offered by the restaurant.

The inventive arrangements described herein also may be used to generate digital humans that may be used as, or function as, virtual news anchors, presenters, greeters, receptionists, coaches, and/or influencers. Example use cases may include, but are not limited to, a digital human performing a daily news-reading, a digital human functioning as a presenter in a promotional or announcement video, a digital human presented in a store or other place of business to interact with users to answer basic questions, a digital human operating as a receptionist in a place of business such as a hotel room, vacation rental, or other attraction/venue. Use cases include those in which accurate mouths and/or lip motion for enhanced realism is preferred, needed, or required. Coaches and influencers would be able to create virtual digital humans of themselves which will help them to scale and still deliver personalized experiences to end users.

In one or more other examples, digital humans generated in accordance with the inventive arrangements described herein may be included in artificial intelligence (AI) chat bot and/or virtual assistant applications as a visual supplement. Adding a visual component in the form of a digital human to an automated or AI enabled chat bot may provide a degree of humanity to user-computer interactions. The disclosed technology can be used as a visual component and displayed in a display device as may be paired or used with a smart-speaker virtual assistant to make interactions more human-like. The cache-based system described herein maintains the illusion of realism.

In one or more examples the virtual chat assistant may not only message (e.g., send text messages) into a chat with a user, but also have a visual human-like form that reads the answer. Based on the disclosed technology, the virtual assistant can be conditioned on both the audio and head position while keeping high quality rendering of the mouth.

In one or more other examples, autoencoder network 102 may be used in the context of content creation. For example, an online video streamer or other content creator (including, but not limited to, short-form video, ephemeral media, and/or other social media) can use autoencoder network 102 to automatically create videos instead of recording themselves. The content creator may make various video tutorials, reviews, reports, etc. using digital humans thereby allowing the content creator to create content more efficiently and scale up faster.

The inventive arrangements may be used to provide artificial/digital/virtual humans present across many vertical industries including, but not limited to, hospitality and service industries (e.g., hotel concierge, bank teller), retail industries (e.g., informational agents at physical stores or virtual stores), healthcare industries (e.g., in office or virtual informational assistants), home (e.g., virtual assistants, or implemented into other smart appliances, refrigerators, washers, dryers, and devices), and more. When powered by business intelligence or trained for content specific conversations, artificial/digital/virtual humans become a versatile front-facing solution to improve user experiences.

The inventive arrangements are capable of communicating naturally, responding in contextualized exchanges, and interacting with real humans in an efficient manner with reduced latency and reduced computational overhead.

In one or more other embodiments, autoencoder network 102 may be used with or as part of an online video gaming system or network.

Figure 10:
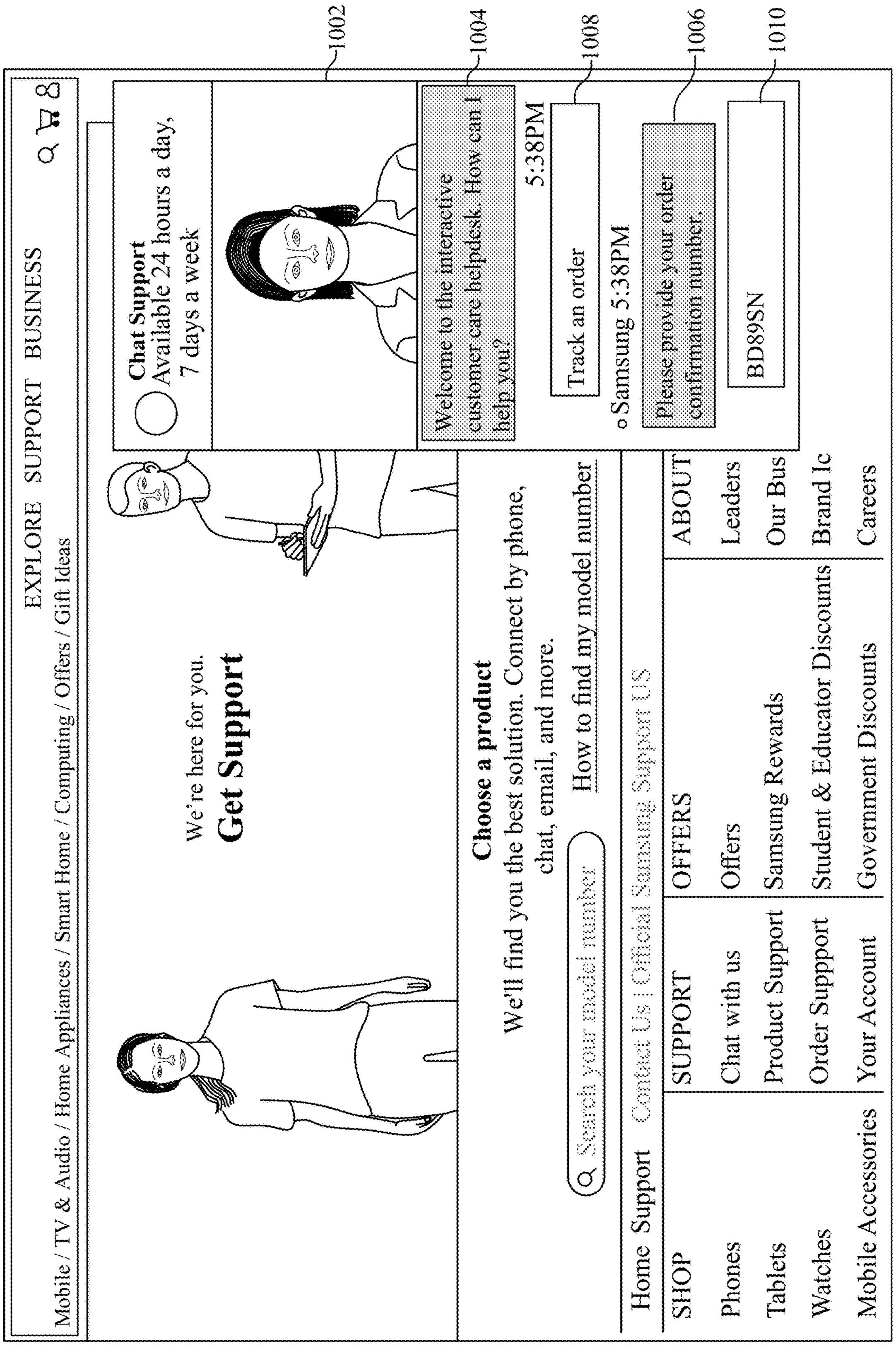
FIG. 10 illustrates an example implementation in which an autoencoder network is used in the context of chat support.

FIG. 10 illustrates an example implementation in which autoencoder network 102 is used in the context of chat support. In the example, a view generated by data processing system 900 as may be displayed on a display screen is shown. In the example, region 1002 displays content generated by autoencoder network 102 as may be executed by data processing system 900 or another system and delivered to data processing system 900. In the example, the digital human shown speaks the target responses that are also conveyed as text messages 1004, 1006. The user response is shown as text message 1008. Further, the user is able to interact with the digital human by way of the field 1010 whether by voice or typing. For example, autoencoder network 102 may be used in combination with a chat bot or an AI-driven chat bot.

Figure 11:
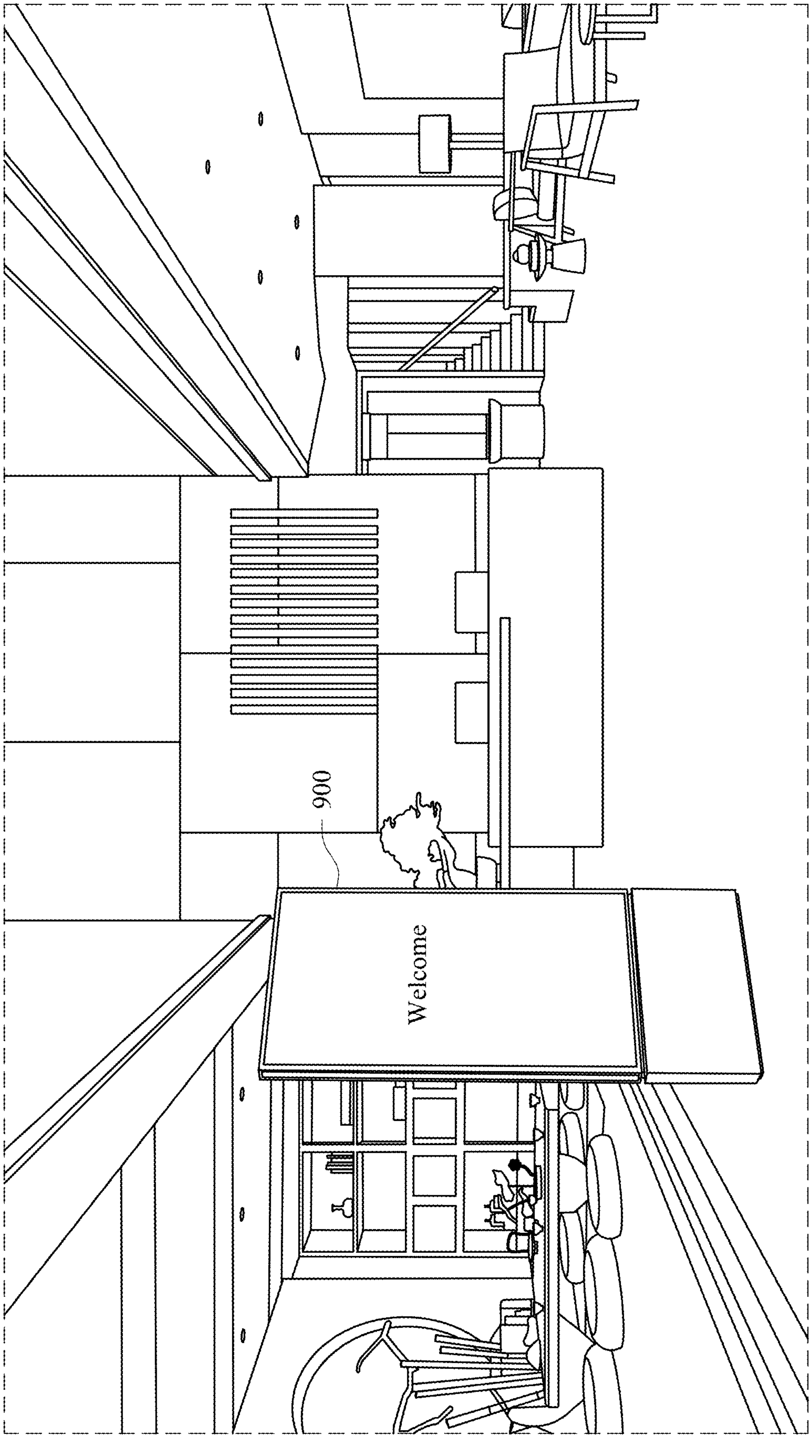
FIG. 11 illustrates an example in which an autoencoder network is operative within a data processing system implemented as a kiosk.

FIG. 11 illustrates an example in which data processing system 900 is implemented as a kiosk having a screen, microphone, and display to play content to a user and receive input from the user.

In one or more other example implementations, autoencoder network 102 may be incorporated into other collaborative systems that support chat communications. Such systems may include social media systems and/or networks and any such system that may be configured to provide help, support, and/or feedback to users and/or respond to user inputs and/or queries.

Figure 12:
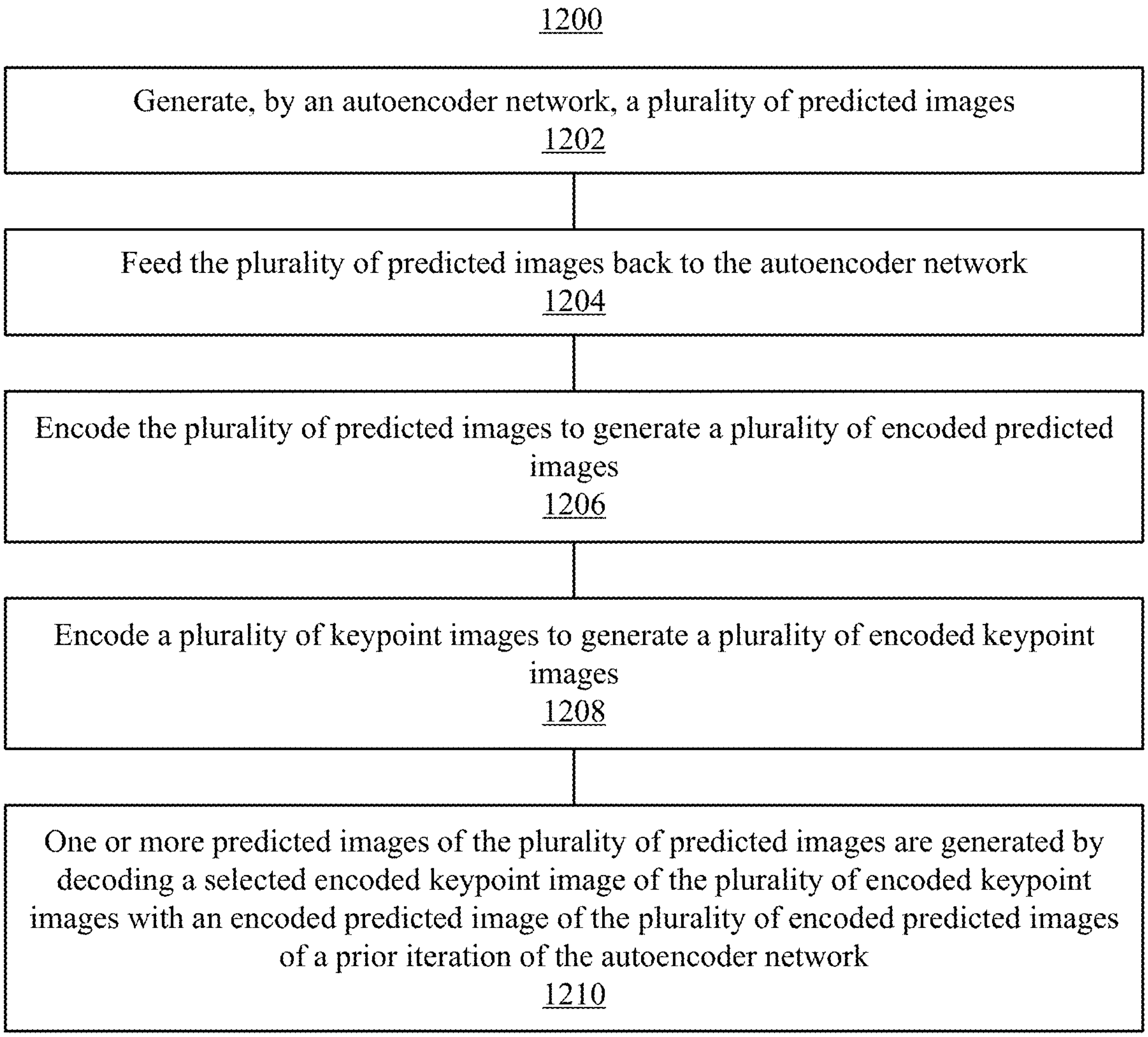
FIG. 12 is a method illustrating certain operative features of the executable frameworks described within this disclosure in accordance with one or more embodiments of the disclosed technology.

FIG. 12 is a method 1200 illustrating certain operative features of the executable frameworks described within this disclosure in accordance with one or more embodiments of the disclosed technology. Method 1200 may be performed by a data processing system such as the example data processing system described in connection with FIG. 9 executing one or more of the various frameworks described herein in connection with FIGS. 1, 3, 5, 6, 7, and/or 8.

In block 1202, autoencoder network 102 generates a plurality of predicted images 134. In block 1204, the plurality of predicted images 134 are feed back to autoencoder network 102. In block 1206, the plurality of predicted images 134 are encoded to generate a plurality of encoded predicted images 116. The plurality of predicted images 134 may be encoded by encoder 104. In block 1208, a plurality of keypoint images 130 are encoded to generate a plurality of encoded keypoint images 132. In block 1210, one or more predicted images of the plurality of predicted images 134 are generated by decoding a selected encoded keypoint image of the plurality of encoded keypoint images 130 with an encoded predicted image of the plurality of encoded predicted images 116 of a prior iteration of autoencoder network 102.

In one or more embodiments, a classification result 150 is generated by classifying one or more of the plurality of predicted images and one or more of a plurality of ground truth images as generated or ground truth. The classification result 150 is fed back to autoencoder network 102.

In one or more aspects, the classifying operates on two or more of the plurality of predicted images 134 and two or more of the plurality of ground truth images 140.

In one or more aspects, the one or more of the plurality of ground truth images correspond to the one or more of the plurality of predicted images used for the classifying on a one-to-one basis.

In one or more embodiments, a further classification result 152 is generated by classifying a selected masked predicted image 160 of the plurality of predicted images 134 and a ground truth image 140 as generated or ground truth. The further classification result 152 is fed back to autoencoder network 102.

In some aspects, the masked predicted image 160 has only a mouth region showing.

In one or more embodiments, additional data of one or more modalities is encoded to generate encoded additional data (e.g., encoded data 506). The one or more additional modalities differ from the modality of the plurality of keypoint images 130 and the modality of the plurality of predicted images 134. In that case, the one or more predicted images of the plurality of predicted images 134 are generated by decoding the additional data (e.g., encoded data 506) with the selected encoded keypoint image of the plurality of encoded keypoint images 130 and the encoded predicted image of the plurality of encoded predicted images 134 of the prior iteration of autoencoder network 102.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to a display or other peripheral output device, sending or transmitting to another system, exporting, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a Digital Signal Processor (DSP), a Graphics Processing Unit (GPU), and a controller.

As defined herein, the term "real-time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the disclosed technology. Within this disclosure, the term "program code" is used interchangeably with the terms "computer readable program instructions" and "program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:

generating, by an autoencoder network, a plurality of predicted images, wherein the plurality of predicted images are red, green, blue (RGB) images;

feeding the plurality of predicted images back to the autoencoder network;

encoding the plurality of predicted images to generate a plurality of encoded predicted images; and encoding a plurality of keypoint images to generate a plurality of encoded keypoint images;

wherein one or more predicted images of the plurality of predicted images are generated by decoding a selected encoded keypoint image of the plurality of encoded keypoint images with an encoded predicted image of the plurality of encoded predicted images of a prior iteration of the autoencoder network.

2. The method of claim 1, wherein the autoencoder network is trained, at least in part, by:

generating a classification result by classifying one or more of the plurality of predicted images and one or more of a plurality of ground truth images as generated or ground truth; and feeding back, to the autoencoder network, the classification result.

3. The method of claim 2, wherein the autoencoder network is further trained at least in part by:

generating a further classification result by classifying a selected masked predicted image of the plurality of predicted images and a ground truth image as generated or ground truth; and feeding back, to the autoencoder network, the further classification result.

4. The method of claim 3, wherein the selected masked predicted image has only a mouth region showing.

5. The method of claim 3, wherein the classification result and the further classification result each is provided to the autoencoder as input and encoded with the plurality of predicted images that are fed back and the plurality of keypoint images for decoding.

6. The method of claim 1, further comprising:

encoding additional data of a modality that differs from the plurality of keypoint images and the plurality of predicted images to generate encoded additional data;

wherein the one or more predicted images of the plurality of predicted images are generated by decoding the additional data with the selected encoded keypoint image of the plurality of encoded keypoint images and the encoded predicted image of the plurality of encoded predicted images of the prior iteration of the autoencoder network.

7. The method of claim 6, wherein the additional data comprises facial expression data specifying, for each predicted image generated, a selected facial expression selected from a plurality of facial expressions, wherein the selected facial expression informs the autoencoder network how to form a facial expression for a digital human pictured in the predicted image.

8. A system, comprising:

a processor configured to execute operations including:

generating, by an autoencoder network, a plurality of predicted images, wherein the plurality of predicted images are red, green, blue (RGB) images;

feeding the plurality of predicted images back to the autoencoder network;

encoding the plurality of predicted images to generate a plurality of encoded predicted images; and encoding a plurality of keypoint images to generate a plurality of encoded keypoint images;

wherein one or more predicted images of the plurality of predicted images are generated by decoding a selected encoded keypoint image of the plurality of encoded keypoint images with an encoded predicted image of the plurality of encoded predicted images of a prior iteration of the autoencoder network.

9. The system of claim 8, wherein the processor is configured to execute operations for training the autoencoder network comprising:

generating a classification result by classifying one or more of the plurality of predicted images and one or more ground truth images of a plurality of ground truth images as generated or ground truth; and feeding back, to the autoencoder network, the classification result.

10. The system of claim 9, wherein the processor is configured to execute operations for training the autoencoder network further comprising:

generating a further classification result by classifying a selected masked predicted image of the plurality of predicted images and a ground truth image as generated or ground truth; and feeding back, to the autoencoder network, the further classification result.

11. The system of claim 10, wherein the selected masked predicted image has only a mouth region showing.

12. The system of claim 10, wherein the classification result and the further classification result each is provided to the autoencoder as input and encoded with the plurality of predicted images that are fed back and the plurality of keypoint images for decoding.

13. The system of claim 8, wherein the processor is configured to execute operations comprising:

encoding additional data of a modality that differs from the plurality of keypoint images and the plurality of predicted images to generate encoded additional data;

wherein the one or more predicted images of the plurality of predicted images are generated by decoding the additional data with the selected encoded keypoint image of the plurality of encoded keypoint images and the encoded predicted image of the plurality of encoded predicted images of the prior iteration of the autoencoder network.

14. The system of claim 13, wherein the additional data comprises facial expression data specifying, for each predicted image generated, a selected facial expression selected from a plurality of facial expressions, wherein the selected facial expression informs the autoencoder network how to form a facial expression for a digital human pictured in the predicted image.

15. A computer program product comprising one or more non-transitory computer readable storage mediums having an autoencoder network stored thereon, the autoencoder network comprising:

a first encoder configured to encode a plurality of predicted images to generate a plurality of encoded predicted images, wherein the plurality of predicted images are red, green, blue (RGB) images;

a second encoder configured to encode a plurality of keypoint images to generate a plurality of encoded keypoint images; and a decoder configured to generate the plurality of predicted images by iteratively decoding a selected encoded keypoint image of the plurality of encoded keypoint images with an encoded predicted image of the plurality of encoded predicted images of a prior iteration of the autoencoder network;

wherein the plurality of predicted images are fed back to the autoencoder network to generate further predicted images.

16. The computer program product of claim 15, wherein the autoencoder network further comprises:

a spatio-temporal discriminator configured to generate a classification result by classifying two or more predicted images of the plurality of predicted images and two or more ground truth images of a plurality of ground truth images as generated or ground truth;

wherein the classification result is fed back to the autoencoder network.

17. The computer program product of claim 16, wherein the autoencoder network further comprises:

a masked image discriminator configured to generate a further classification result by classifying a selected masked predicted image of the plurality of predicted images and a ground truth image as generated or ground truth;

wherein the further classification result is fed back to the autoencoder network.

18. The computer program product of claim 17, wherein the selected masked predicted image has only a mouth region showing.

19. The computer program product of claim 17, wherein the classification result and the further classification result each is provided to the autoencoder as input and encoded with the plurality of predicted images that are fed back and the plurality of keypoint images for decoding.

20. The computer program product of claim 15, wherein the autoencoder network further comprises:

one or more additional encoders configured to encode additional data of a modality that differs from the plurality of keypoint images and the plurality of predicted images to generate encoded additional data;

wherein the decoder iteratively decodes the encoded additional data with the selected encoded keypoint image of the plurality of encoded keypoint images and the encoded predicted image of the plurality of encoded predicted images of the prior iteration of the autoencoder network.

* * * * *